3,471,433
PROCESS OF PREPARING ACRYLIC POLYMER PIGMENT DISPERSIONS
Claude G. Bradley, Baton Rouge, La., and Nealie T. Anderson, Decatur, Ala., assignors to Monsanto Company, St. Louis, Mo., a corporation of Delaware
No Drawing. Filed Nov. 7, 1966, Ser. No. 592,284
Int. Cl. C08f 29/54, 45/08, 45/44
U.S. Cl. 260—32.6                                                      6 Claims

ABSTRACT OF THE DISCLOSURE

A uniform and stable pigment dispersion is obtained by mixing a highly ionizable acid with an organic solvent for acrylic polymers, dispersing the pigment therein, and adding a viscous solution of an acrylic polymer in an organic solvent to the dispersion to increase the viscosity thereof and to stabilize the dispersion.

---

This invention relates to pigment dispersing aids for use in the production of acrylic fibers. More specifically, this invention deals with improved pigment dispersions and a method of aiding the dispersion of pigments throughout synthetic linear polymers and shaped articles prepared therefrom.

Heretofore, the use of pigments in coloring fibers and fibrous articles has been known and used for some time. There has been an increasing use of pigments for coloring fibers, especially with regard to "dope dyeing." Dope dyeing is the incorporation of pigments into the spinning solutions prior to formation of fibers. When fibers are colored by this method, exceptional light and wash fastness are obtained, which is definitely an improvement over conventional dyeing. Also, pigmenting fibers is more economical than conventional dyeing due to the elimination of expensive drying operations.

It is a basic requiremet in the pigmentation of acrylic fibers that the pigment articles be uniformly dispersed throughout the spinning solution. Any agglomeration of the pigment results in premature filter pluggage and in poor spinning performance characterized by filament breaks in the coagulation bath as the spinning solution is extruded through the spinnerette.

Good pigment dispersions in acrylic spin dopes may be obtained with pigments which have previously been combined with cellulose acetate. However, these combination or pre-dispersed pigments are expensive, and, since the cellulose acetate is not compatible with the acrylic spinning solution, it has a delustering effect on the fiber product and therefore, deep, pure translucent colors cannot be obtained. Furthermore, considerable leaching of the cellulose acetate occurs during wet spinning, and spinnability is generally inferior to non-cellulose acetate containing fibers.

Accordingly, the difficulties of the prior art are overcome by dispersing straight toner pigments (non-predispersed pigments) in a solution comprising an organic solvent and an ion contributor.

Therefore, it is an object of this invention to provide an improved pigment dispersion.

Another object of this invention is to provide an economical pigment dispersion and a process for utilizing same.

Also, an object of this invention is to provide a pigment dispersion for uniform coloration of linear polymers.

Further, it is an object of this invention to eliminate the incompatibility of the pigment dispersion and the polymer.

Another object of this invention is to reduce yarn cost and yarn contamination.

It has been discovered that a uniform dispersion of the pigment particles having little tendency to reagglomerate is obtained by mechanically dispersing the pigment in a solvent for the acrylic polymer such as dimethyl formamide or dimethylacetamide to which has previously been added a small amount of a highly ionizable acid such as sulfuric, di- or trichloroacetic, phosphorous, or pyrophosphoric acid. Suitable acids are those which are nonreactive with the solvent and have an ionization constant ($k$) such that $-\log k$ is not substantially greater than 2.

The ionization constants ($k$) of the above enumerated acids are given as follows in Langes' Handbook of Chemistry, 8th edition.

| Acid | $k$ | $\log k$ |
| --- | --- | --- |
| Dichloroacetic | $5 \times 10^{-2}$ | 1.30 |
| Phosphorous | $(k_1)\ 1.6 \times 10^{-2}$ | 1.80 |
| Pyrophosphoric | $(k_1)\ 1.4 \times 10^{-1}$ | 0.85 |
| Sulfuric | $(k_1)\ 4 \times 10^{-1}$ | 0.40 |
| Trichloroacetic | $1.3 \times 10^{-1}$ | 0.89 |

Heretofore, efforts to produce pigment dispersions from straight toners without any type of pre-dispersing have depended upon the incorporation of recognized dispersing aids and surfactants, and many compounds have been tried and tested with little success. The function of these dispersing aids was to prevent reagglomeration of the pigment particles once the particles have been separated by vigorous mechanical agitation. In general, the known surfactants have not been completely effective in maintaining the mechanically induced dispersions, and have been detrimental to spinning perforance. In some instances expensive equipment was required to preheat the dispersing agent and to maintain the pigment dispersion at an elevated temperature in order to prevent the dispersant from freezing out of solution. Preferred organic pigments for incorporation into acrylic polymers in accordance with this invention include the insoluble azo group among which may be mentioned Pigment Blue WNL (CI 21180), Benzidine Toluidide Yellow (CI 21095); anthraquinone and vat pigments, for example Madder Lake (CI 58000), Thio Fast Red MU-6606 (CI 73310), Indanthrone Yellow GK (CI 61725), Indanthrone Blue, Green Shade (CI 69810 and Thioindigo Red (CI 73310); Phthalocyanine pigments such as Phthalocyanine Green (CI 74260), Phthalocyanine Blue (CI 74160), and Zona Blue (CI 74160); and miscellaneous organic pigments not otherwise classified such as Acrylamino Yellow, which is described in U.S. Patent No. 2,727,044. Soluble azo, basic and condensation acid pigments are suitable although not preferred since such pigments are soluble in some commonly used solvents. Applicable inorganic pigments include titanium dioxide, zinc oxide, aluminum oxide, magnesium oxide, iron oxides, lithopone, ultramarines, lead chromate, cadmium sulfide, cadmium selenide, barium sulfate, and carbon blacks.

In utilizing this invention, expensive high shear mechanical agitation and elaborate process equipment are not needed. As stated before, uniform and stable dispersions are obtained by dispersing the pigment in an organic solvent containing a small amount of highly ionizable acid. The pigment particles absorb or associate themselves with a particular ion, thereby taking on the charge of the ion. The result is an electrical repulsive effect between pigment particles which prevents them from reagglomerating.

In order to prevent the dispersed pigment from physically settling out of the solvent, the viscosity of the mixture is increased by the addition of acrylic polymer. The polymer is most conveniently added by first dissolving the polymer in additional solvent, then adding this viscous solution to the pigment-solvent dispersion with sufficient aggitation to assure uniform distribution. The final mixture of pigment, polymer, and solvent is referred to as the pigment master batch.

In the production of pigmented acrylic fibers, the master batch solution is injected into a standard unpigmented spinning solution at a rate controlled to provide the desired concentration of pigment in the final spinning solution. After thoroughly mixing the injected solution with the spinning solution, the combination may be extruded and spun according to conventional techniques.

We have found that very good results are obtained using sulfuric acid as the ion contributor, and economical considerations favor its use over the other useful acid compounds. Benefits are realized by using as little as 1 part acid to 10 parts pigment, although visibly better results are obtained when the acid to pigment ratio is increased from 1 to 4.

In order that the present invention may be more fully understood, the following examples are given primarily by way of illustration. No details appearing therein should be construed as limitations on the present invention, except as they appear in the appended claims.

EXAMPLE I 5 grams of 30 percent sulfuric acid were added to 105 grams of dimethyl acetamide and agitated to effectuate complete mixing. Then 15 grams of Columbian Carbon Company No. 999 Carbon Black fluf (CI Pigment Black 7, CI 77266) were added, and the mixture agitated for 30 minutes. To stabilize this mixture, 110 grams of acrylic dope composed of 76.5 percent of a copolymer being 93 percent acrylonitrile and 7 percent vinyl acetate, 10.5 percent of a copolymer being 50 percent acrylonitrile and 50 percent methylvinyl pyridine, and 13 percent polyvinyl chloride, containing 18.7 percent solids were added and agitated for 20 minutes to form the pigment master batch containing 6.4 percent black pigment. Microscopic examination of the dispersion showed very little agglomeration of the pigment particles. In contrast, examination of a similar master batch prepared without the sulfuric acid showed considerable agglomeration.

The pigment master batch prepared according to this invention was injected into and thoroughly mixed with an acrylic spin dope of the same composition as above, at a rate sufficient to provide 2.5 percent pigment in the combination. Spinnability of the pigmented dope was very good.

EXAMPLE II 20 grams of 30 percent sulfuric acid were added to 200 grams of dimethyl acetamide and agitated to effectuate complete mixing. Then 25 grams of Columbian Carbon Company No. 999 Carbon Black fluf pigment (CI Pigment Black 7, CI 77266) were added and the mixture was agitated for 30 minutes. To stabilize this mixture, 350 grams of the acrylic dope described in Example I were added and the mixture agitated for 20 minutes. Microscopic examination of the master batch showed the dispersion was not only superior to the non acid containing dispersion, but also superior to the dispersion of Example I where a smaller amount of acid was used. It was thus determined that approximately one part sulfuric acid per 4 parts pigment is sufficient to disperse toner pigments in dimethyl acetamide.

The foregoing examples illustrate the essential features of the invention as well as some of the manners in which it may be practiced. Various changes and modifications may be made in practicing the invention without departing from the spirit and scope thereof, and therefore, the invention should not be limited except as defined in the appended claims.

We claim:
1. A process for producing a uniform and compatible pigment dispersion comprising the steps of:
 (a) mixing an acid with an organic solvent selected from the group consisting of dimethylacetamide and dimethylformamide, said acid being nonreactive with the solvent and characterized by having an ionization constant ($k$) wherein the value of $-\log k$ is less than about 2.0,
 (b) dispersing a pigment in the acid-solvent mixture in a ratio of at least 1 part acid to 10 parts pigment on a weight basis,
 (c) adding to the pigment dispersion a solution of an acrylic polymer dissolved in a solvent selected from the group consisting of dimethylacetamide and dimethylformamide, whereby the viscosity of the dispersion in increased to prevent the pigment from settling out.

2. A process according to claim 1 wherein the acid is selected from the group consisting of sulfuric acid, dichloroacetic acid phosphorous acid, pyrophosphoric acid, and trichloroacetic acid.

3. A process according to claim 1 wherein the acid is sulfuric acid and the ratio of acid to pigment is between 1:10 and 1:4.

4. A process according to claim 1 wherein the pigment is a toner pigment.

5. A process according to claim 1 wherein the pigment is carbon black.

6. A process according to claim 3 wherein the pigment is carbon black.

References Cited

FOREIGN PATENTS 28,352   4/1964   Germany.

ALLAN LIEBERMAN, Primary Examiner

U.S. Cl. X.R.

106—30.8; 260—41